United States Patent [19]

Schmidt

[11] 4,357,644

[45] Nov. 2, 1982

[54] RATIO GROUND RELAYS

[75] Inventor: Warren J. Schmidt, Coral Springs, Fla.

[73] Assignee: Westinghouse Electric Corp., Pittsburgh, Pa.

[21] Appl. No.: 245,768

[22] Filed: Mar. 20, 1981

[51] Int. Cl.³ .............................................. H02H 3/26
[52] U.S. Cl. ...................................... 361/76; 361/77; 361/85
[58] Field of Search ....................... 361/76, 77, 85, 86, 361/87, 210

[56] References Cited

U.S. PATENT DOCUMENTS

| | | | |
|---|---|---|---|
| 1,702,454 | 2/1929 | Todd | 361/77 X |
| 1,883,839 | 10/1932 | Webb | 361/85 X |
| 3,172,012 | 3/1965 | Gafford | 361/76 |
| 4,297,740 | 10/1981 | Hagberg | 361/67 |

OTHER PUBLICATIONS

Pages 1190-1200 IEEE Transactions on Power Apparatus and Systems, vol. PAS-90, No. 3, May/Jun. 1971.
Instruction Leaflet 41-1107 A K CW A.
Innovative Relay Methods for Detecting High Impedance Faults on Distribution Circuits—American Power Conf. Apr. 23-26, 1979, L. A. Kilar et al.
Improved Relay Schemes for Detection of Fallen Conductors on 3ϕ, Four Wire, Dist. Ckts., Kilar, Rosado, Shankle and Lee.
Summary and Status Report on Research To Detect and De-Energize High Imp. Faults on 3ϕ, Fourwire Dist. Ckts., Kilar and Lee.
It's Tough to Relay High-Impedance Faults, R. F. Wolff, Electrical World, Aug. 1, 1979, pp. 32, 33.

Primary Examiner—Reinhard J. Eisenzopf
Attorney, Agent, or Firm—D. R. Lackey

[57] ABSTRACT

Ratio ground induction disc relays for detecting open phases and phase-to-ground faults. An operating torque is applied to the induction disc which varies as a function of the zero sequence current. The phase currents are utilized in different arrangements to provide a restraining torque which varies as a function of predetermined different parameters, such as the sum of certain phase currents, the positive sequence current, or the positive sequence current minus the negative sequence current.

7 Claims, 5 Drawing Figures

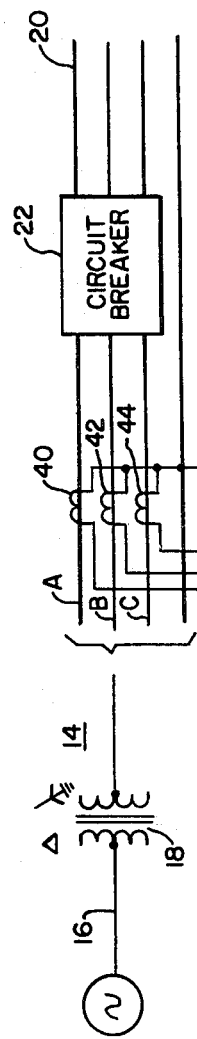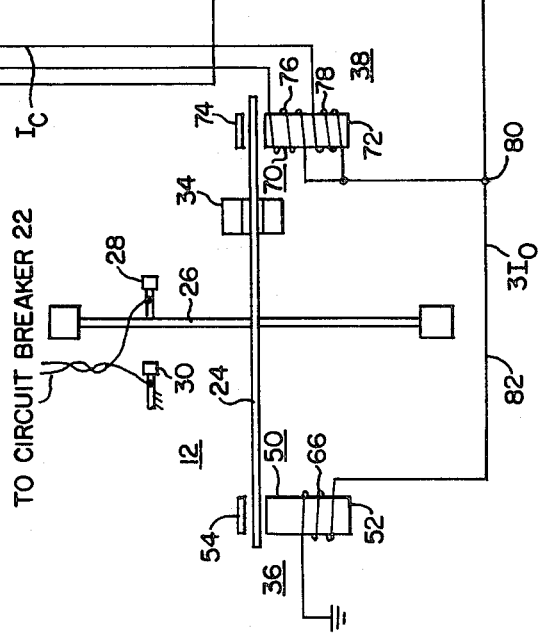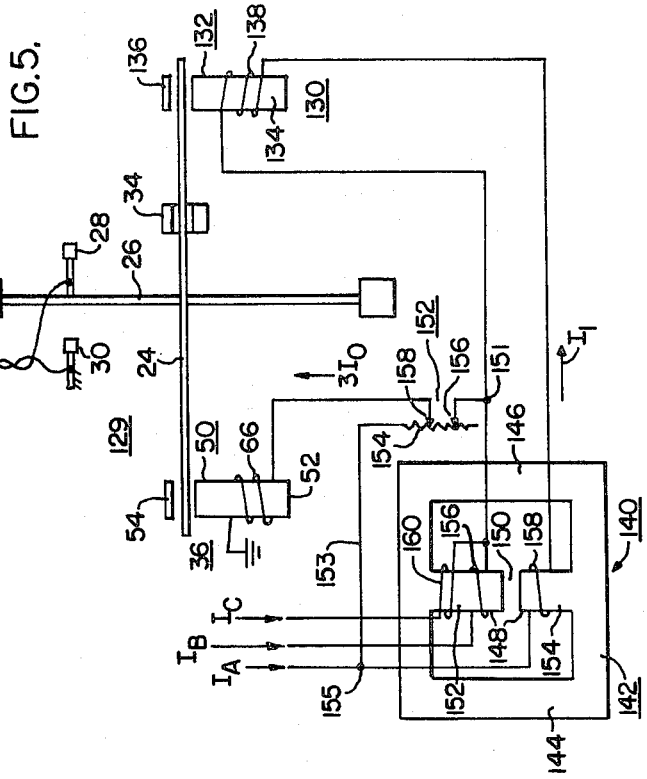

RATIO GROUND RELAYS

BACKGROUND OF THE INVENTION

1. Field of the Invention

The invention relates in general to protective relay apparatus for three-phase electrical power systems, and ore specifically to protective relay apparatus for detecting open phases, and single-phase-to-ground faults, in four-wire electrical distribution circuits.

2. Description of the Prior Art

A conventional distribution substation for supplying three-phase and single-phase loads includes a three-phase circuit breaker equipped with phase overcurrent relays, and sometimes a ground-current relay. Reclosers and fuses complete the protection of the distribution circuit. Coordination is necessary between these protective devices in order to isolate only the required portion of the distribution circuit when a fault occurs. Because of normal circuit load unbalances, as well as normal cold-load pickup and switching surges, a ground relay, if used, must be set quite high in order to prevent nuisance tripping of the circit breaker. Broken conductors close to or touching the ground through high impedance paths may not produce enough current or circuit unbalance to operate the phase overcurrent protective devices, or the ground relay.

Prior art ratio ground relays have been solid state devices which develop zero sequence and positive sequence signals from sequence filter networks, which signals are rectified and compared with one another, and with threshold levels to determine if timing should be initiated, and if so, which one of certain timers should be activated. The timers provide the necessary coordination with other protective devices used in the distribution network.

SUMMARY OF THE INVENTION

Briefly, the present invention is a new and improved ratio ground relay which uses the electromechanical induction principle to compare operating and restraining quantities. An operating quantity is applied to an electromagnet which is coupled to an electroconductive armature arranged to actuate electrical contacts at a predetermined angular location of the armature. The armature is originally at a predetermined angular location, biased against a stop via a suitable spiral spring. The operating electromagnet produces a torque in the armature which rotates the armature away from the stop and towards the contact actuating position. At least one restraining electromagnetic is coupled to the armature such that when energized by a restraining quantity, it produces a torque which rotates the armature towards the stop and away from the contact actuating position. Thus, a net torque in the contact actuating direction results in contact actuation with an inverse time characteristic, and a net torque in the direction of the stop prevents contact actuation.

It is felt that comparison of the operating and restraining quantities of a ratio ground relay in an electromechanical relay, as opposed to a solid state relay, as many advantages. The need for a delay timer, or timers, is eliminated, because the induction relay operating time is selected by a simple adjustment via a time dial. Unlike many protective relay functions, the ratio ground relay must operate only after the other protective relay functions have had an opportunity to clear the fault. Thus, speed is not only not important, it is a distinct disadvantage, as some extra means must be employed if the relay is inherently fast, in order to provide the desired coordination delay.

The electromechanical induction type ratio ground relay, in addition to having the requisite sensitivity time characteristic has many other advantages. For example, it has the highest reliability, the lowest initial cost and the highest noise immunity of any relay type. It is easy to understand by those who must install, calibrate and maintain it. Further, it enables a plurality of different restraint functions to be used, with the present invention setting forth desirable embodiments for the restraint function, wherein the restraint function varies as one of the following:

(a) as a function of two phase currents, (b) as a function of the positive sequence current minus the zero sequence current, (c) as a function of the sum of the three-phase currents, and (d) as a function of the positive sequence current.

BRIEF DESCRIPTION OF THE DRAWINGS

The invention may be better understood and further advantages and uses thereof more readily apparent, when considered in view of the following detailed description of exemplary embodiments taken with the accompanying drawings in which:

FIG. 1 is a schematic diagram of an electromechanical ratio ground relay constructed according to a first embodiment of the invention, wherein the restraining torque varies as a function of the sum of any two of the phase currents;

FIG. 5 is a schematic diagram illustrating an electromechanical induction ratio ground relay having a restraining torque which varies as a function of the positive sequence current.

DESCRIPTION OF THE PREFERRED EMBODIMENTS

Figure 2:
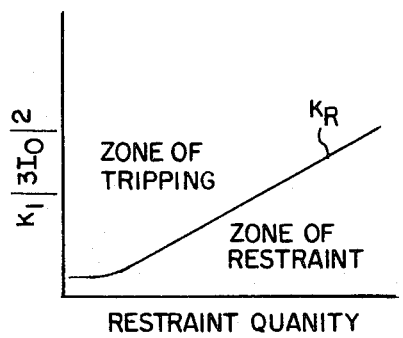
FIG. 2 is a graph which illustrates the operating characteristic of the ratio ground relay shown in FIG. 1, as well as the operating characteristic of the ratio ground relays shown in the remaining figures.

Referring now to the drawings, and to FIG. 1 in particular, there is shown a ratio ground or percent unbalance relay 12 constructed according to a first embodiment of the invention. Relay 12, which is an electromechanical relay of the electroresponsive induction disc type, is associated with a substation 14 in which the transmission voltage of a three-phase transmission line 16 is stepped down to distribution level via a step-down transformer 18 which supplies a three-phase, four-wire distribution circuit 20 via a three-phase circuit breaker 22. The electroresponsive induction disc relay 12 includes an electroconductive armature 24 in the form of a disc. Armature 24 is mounted for rotation on a suitably journaled shaft 26. The rotation of armature 24, and thus shaft 26, is arranged to cause the actuation of electrical contacts. For purposes of example, a first contact 28 is shown carried by shaft 26. Rotation of shaft 26 carries the first contact 28 into, or out of, engagement with a second contact 30, depending upon rotational direction. Closure of the first and second contacts 28 and 30 may be employed to complete an electrical circuit for any desired protective function, such as for initiating the tripping of circuit breaker 22. A spiral spring (not shown) biases shaft 26 to urge the movable first contact 26 away from the stationary contact 30 and against a suitable stop. If desired, the spiral spring may be a current carrying element which may additionally function to mount the movable first contact 28.

Rotation of armature 24 is damped and retarded by suitable damping means, such as a permanent magnet 34, which is coupled with armature 24 to provide a damping force which varies in accordance with the rate of rotation of armature 24.

The angular spacing between contacts 28 and 30 is adjustable, in the fully restrained position, via a time dial, to select the desired time delay characteristic for proper coordination with other protective functions.

In order to provide an operating torque for armature 24, which torque rotates the armature 24 in the contact closing direction, a first electromagnet 36 is provided.

In order to provide a restraining torque for armature 24, which torque rotates armature 24 in the contact opening direction, a second electromagnet 38 is provided. The second electromagnet 38 is energized by certain of the phase currents flowing in phase A, B and C of the distribution circuit 20, such as measured by current transformers 40, 42 and 44, respectively. These current transformers may be the same current transformers already present at the substation for providing current for the overcurrent relays. Relay 12 may replace the normal ground relay used at the substation. The outputs of selected current transformers 40, 42 and 44, after providing current signals for the ratio ground relay 12, and any other protective function, are connected together at 80 to provide a single conductor 82. Any residual or ground current in the three-phase distribution circuit will flow in conductor 82 as the zero sequence current $3I_0$. The zero sequence current $3I_0$ is used to energize the first electromagnet 36.

The details of a suitable first or "operate" electromagnet 36 need not be shown, as different winding-/core configurations which will produce an operating torque as a function of the $3I_0$ current are well known in the art. For example, the first electromagnet 36 may include a magnetic core structure 50 having a unit 52 disposed on one side of armature 24, and a keeper unit 54 disposed on the other side. Unit 52 may be an E-shaped unit having two outer legs and an inner leg, with the ends of the legs defining pole faces which are disposed in predetermined spaced relationship with armature 24. The keeper unit 54, which completes the magnetic circuit between the pole faces, is disposed in predetermined spaced relation with armature 24, but on the opposite side of armature 24 from the E-shaped unit.

A first suitable arrangement includes a winding or coil 66 located on the inner or center leg of the "E" unit which produces a flux which divides and returns through the outer legs. A shading coil on a predetermined leg causes the flux through this leg to lag the main pole flux. The out-of-phase fluxes thus produced in the air gap cause a contact closing torque.

A second suitable arrangement utilizes winding 66 as a primary winding of a transformer arrangement, with winding 66 being disposed on the center leg. A secondary winding is also disposed on the center leg. Each outer leg also includes a winding, which windings are connected to the secondary winding such that the combination of all of the fluxes produced by the electromagnet result in out-of-phase fluxes in the air gap. The out-of-phase air gap fluxes produce a contact closing torque.

As hereinbefore stated, the contact closing torque varies as a function of the $3I_0$ current which excites the winding of the electromagnet, i.e., $K_1|3I_0|^2$, where $K_1$ is a constant determined by the characteristics of the magnetic circuit and the number of winding turns. The rotational direction of this torque is selected such that contact 28 will be carried by armature 24 in the contact closing direction.

The second or restraint electromagnet 38 is excited according to a first embodiment of the invention wherein the restraining torque varies as a function of the sum of any two of the phase currents, i.e., $K_2|I_B+I_C|^2$ where $K_2$ again is a constant determined by the characteristics of the magnetic circuit and windings, and the line currents $I_B$ and $I_C$ are phasors.

More specifically, electromagnet 38 includes a magnetic core structure 70 having a first unit 72 disposed on one side of armature 24, and a second or keeper unit 74 disposed on the other side. Unit 72 may be an E-unit, as described relative to electromagnet 36, having a winding structure disposed on the center or inner leg excited by the phasor sum of the two selected phase currents. For example, first and second windings 76 and 78 may be disposed on the inner leg energized by the output current signals $I_B$ and $I_C$, respectively, from current transformers 42 and 44, respectively. The phase shifted flux in the air gap required to generate a torque in the contact opening direction may be provided by a shading coil on the outer leg which will generate torque in the desired direction; or, by the arrangement whereby windings 76 and 78 function as a primary winding of a transformer arrangement, as hereinbefore described relative to electromagnet 36. The output ends of windings 76 and 78 are connected in common, and also to the output of current transformer 44 at junction 80. Ground current flows in a conductor 82 connected to junction 80, which current is the zero sequence current $3I_0$. Thus, conductor 82 is connected to winding 66 of the first electromagnet 36.

Instead of providing two windings 76 and 78 on the center leg of an E-unit, the outputs of current transformers 40 and 42 may be combined and applied to the input of a single winding on the center leg of the E-unit. The output of this single winding would be connected to the output of current transformer 44 at junction 80.

FIG. 2 is a graph which illustrates the characteristics of relay 12. The operating torque, which is a function of $K_1|3I_0|^2$ is plotted on the ordinate, and the restraining torque which is a function of $K_2|I_B+I_C|^2$ is plotted on the abscissa. The ratio of $K_1|3I_0|^2$ to $K_2|I_B+I_C|^2$ which separates the tripping and restraint zones decribes the line $K_R$. In other words, if $K_1|3I_0|^2>K_2|I_B+I_C|^2$, a net operating torque is produced which rotates the armature 24 in the contact closing direction. The closing of contacts 28 and 30 may be used to trip circuit breaker 22. If $K_1|3I_0|^2<K_2|I_B+I_C|^2$, a net restraining torque is produced and armature 24 will be held against a stop.

Phasor diagrams of the three phase currents $I_A$, $I_B$ and $I_C$, which are spaced by 120 electrical degrees, illustrate that, regardless of which phase is open or grounded, selecting the restraint to vary as the sum of any two phase currents will produce the same restraining torque. For example, if phases B and C are selected to provide the restraint currents, and phase A is grounded, the phasor sum of $I_B$ and $I_C$, where $I_B$ equals $I_C$, is equal to $I_B$, or $I_C$. If phase B is grounded the phasor sum of $I_B$ and $I_C$ is $I_C$, and if phase C is grounded the phasor sum is equal to $I_B$. If the restraint torque provided when there is no fault is equal $T_R$, the restraint torque with any one phase grounded will also be equal to $T_R$.

In addition to having the advantages of the electromechanical induction device hereinbefore set forth, the embodment shown in FIG. 1 is a desirable, low cost, relay assembly, as no sequence filters are required.

Figure 3:
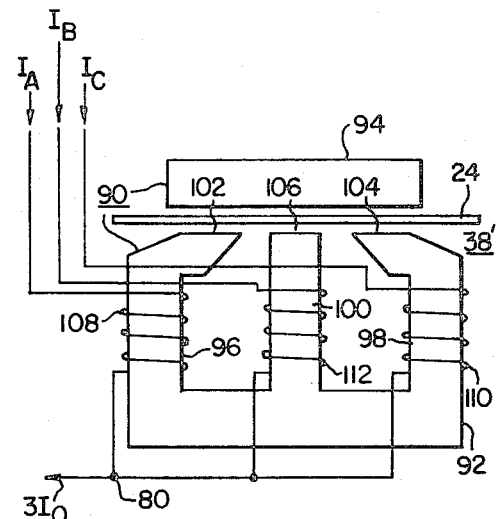
FIG. 3 is a schematic diagram illustrating another restraint arrangement which may be used in place of the restraint arrangement shown in FIG. 1, wherein the restraining torque varies as a function of the positive sequence current minus the negative sequence current.

FIG. 3 is a schematic diagram which sets forth a restraint electromagnet 38' constructed according to the teachings of another embodiment of the invention, which may be used in place of the restraint electromagnet 38 shown in FIG. 1. In this embodiment, the restraining torque varies of a function of the positive sequence current $I_1$ minus the negative sequence current $I_2$, i.e., $K_3(|I_1|^2 - |I_2|^2)$. If the positive sequence current $I_1$ exceeds the negative sequence current $I_2$, a rotating flux is produced in the air gap having the positive sequence A, B, and C, which is arranged to provide a torque in the contact opening direction. As the proportion of the negative sequence current $I_2$ increases, the magnitude of the restraint torque is reduced accordingly. If the positive sequence current $I_1$ is equal to the negative sequence current $I_2$, the torque provided by the restraint electromagnet 38' will be equal to zero, with two of the pole fluxes being in phase with one another, and 180° out of phase with the remaining pole flux. The sum of the two in-phase fluxes is equal to the magnitude of the remaining pole flux to thus provide zero torque. If the negative sequence current $I_2$ then increases beyond the magnitude of the positive sequence current $I_1$, the two fluxes, which were in-phase when $I_1$ equaled $I_2$, move past one another to provide the negative sequence rotation A, C, and B. Thus, two phases of this three-phase "induction motor" have been reversed, reversing the torque direction of the armature, causing it to rotate in the contact closing direction.

More specifically, the restraint electromagnet 38' shown in FIG. 3 includes a magnetic core structure comprising an E-unit 92 disposed on one side of armature or disc 24, and a keeper unit 94 disposed on the other side. The E-unit 92 includes first and second outer legs 96 and 98, respectively, and a center or inner leg 100. The free ends of the legs define pole faces 102, 104 and 106, which are spaced from armature 24 to provide predetermined air gaps. The keeper unit 94 is also spaced a predetermined dimension from armature 24, to provide a predetermined air gap.

Windings 108, 110 and 112 are disposed on outer legs 96 and 98, and center leg 100, respectively, with windings 108, 112 and 110 being connected to be energized by the phase current signals $I_A$, $I_B$, and $I_C$, respectively. The remaining ends of these windings are connected in common at terminal 80. In the same manner described relative to the FIG. 1 embodiment, the loss of any phase results in the same restraining torque, as the phasors of the two remaining phases are 120° apart. The electromechanical induction relay provides the restraining torque as a function of $I_1 - I_2$ without the necessity of using sequence filters. In addition to comparing the zero sequence and positive sequence currents, it adds the additional dimension of reducing the restraint torque as a function of negative sequence current. In this embodiment, if the restraining torque provided when there is no fault is $T_R$, the restraining torque with any one phase open or grounded will be $\frac{1}{3} T_R$.

Figure 4:
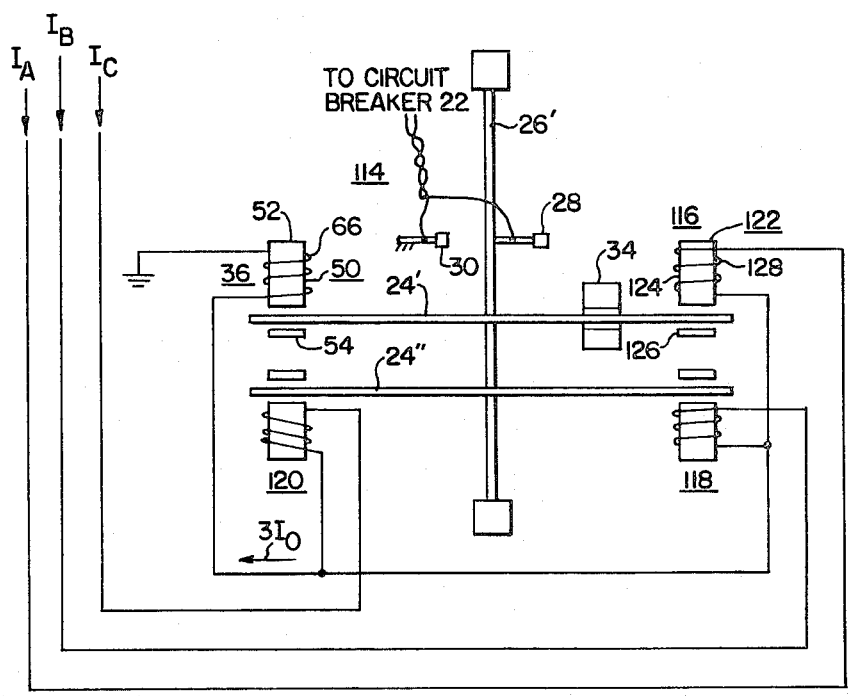
FIG. 4 is a schematic diagram illustrating an electromechanical induction ratio ground relay having still another restraint arrangement, wherein the restraining torque varies as a function of the sum of the three phase currents.

FIG. 4 is a schematic diagram of an electromechanical ratio ground induction relay 114 constructed according to another embodiment of the invention. In this embodiment, the restraining torque is a function of the sum of the three phase currents $I_A$, $I_B$, and $I_C$, i.e., $K_4(|I_A|^2 + |I_B|^2 + |I_C|^2)$. The elements of relay 114 which are similar to relay 12 are given the same reference numerals. Slightly modified components are given the same reference numeral with a prime mark. In this embodiment, in addition to the "operate" electromagnet 36, first, second and third "restraint" electromagnets 116, 118 and 120, respectively, are utilized. Because the space around disc 24 is limited, instead of a single disc 24 being used, first and second discs 24' and 24" are used with both being coupled to the same shaft 26'.

Thus, two of the electromagnets, such as electromagnets 36 and 116 may be disposed adjacent to armature or disc 24', and the remaining electromagnets 118 and 120 may be disposed adjacent to armature 24". As in the prior embodiments, electromagnet 36 is energized by the $3I_0$ current and arranged to provide a torque which tends to rotte armature 24', and thus shaft 26', in the contact closing direction. The remaining three electromagnets 116, 118 and 120 are each energized by a different line current signal $I_A$, $I_B$ and $I_C$, respectively. Electromagnet 116 includes a magnetic core 122 having a first unit 124 disposed on one side of armature 24' and a second or keeper unit 126 disposed on the other side. Unit 124 may be an E-unit having a winding 128 on the center leg. The E-unit 124 and winding 128 may be arranged as hereinbefore described relative to the other embodiments to develop the out-of-phase flux in the air gap essential to torque generation. The electromagnets 118 and 120 may be constructed similar to electromagnetic 116 and will not be described in detail.

In the FIG. 4 embodiment, the restraint torque varies as a function of $K_4(|I_A|^2 + |I_B|^2 + |I_C|^2)$ with the characteristics of the magnetic circuits, number of turns in the windings, and other constants, appearing in $K_4$. The opening or grounding of any phase results in a like restraining torque being generated, as the two remaining phases will be 120 electrical degrees apart, each contributing a like restraint torque to the shaft 26' via their associated armature. If the restraining torque provided when there is no fault is equal to $T_R$, the restraining torque with any one phase open or grounded will be $\frac{2}{3} T_R$.

The embodiments of FIGS. 1, 3 and 4 require no sequence filters. The operating torque is provided by the zero sequence current developed by connecting the outputs of the current transformers together which measure the three phase currents, and restraining torque is provided directly from the phase current signals. FIG. 5 is an embodiment of the invention that sets forth an electromechanical induction relay 129 in which the restraining torque varies as a function of the positive sequence current $I_1$, i.e., $K_5|I_1|^2$. The positive sequence current $I_1$ in this embodiment is developed in a positive sequence current filter 140.

Relay 129 has certain similarities to relay 12 shown in FIG. 1, with like elements being indicated with like reference numerals. A "restraint" electromagnet 130 is provided having a magnetic core structure 132 which includes a first element 134 disposed on one side of armature 24, and a second or keeper element on the other side. Element 134 may be an E-unit, having a winding 138 disposed on the center leg. Similar to the other embodiments of the invention, the out-of-phase flux may be provided by a shading coil on an outer leg, or by a transformer arrangement in which winding 138 is the primary winding. In any event, winding 138 is energized by the positive sequence current $I_1$ at the relaying point, i.e., at the substation.

FIG. 5 illustrates an exemplary positive sequence filter 140 which may be used. Filter 140 includes a magnetic core structure 142 of the shell-form type having outer legs 144 and 146, and an inner winding leg 148 having a non-magnetic gap 150 therein which divides leg 148 into first and second portions 152 and 154, respectively. Windings 156 and 158 are disposed on leg portions 152 and 154, respectively, which are wound to provide additive flux, and a winding 160 is disposed on leg 152 which is wound to provide an opposing flux. Windings 158, 156, and 160 are energized by the line current signals $I_A$, $I_B$, and $I_C$, respectively. The output of winding 158 provides the positive sequence current, and it is thus connected to the input of winding 138 of the restraint electromagnet 130. The outputs of windings 156 and 160 are connected in common to the output of winding 138 at terminal 151. The phase A line current signal, $I_A$ is split before it enters winding 158 via a tuning circuit which includes a conductor 153 connected to the phase A line current signal conductor at terminal 155. Conductor 155 is connected to one end of the resistive portion of a tapped tuning resistor 152. Terminal 151 is connected to a first tap 156 and a second tap 158 provides the $3I_0$ current signal for winding 66 of the "operating" electromagnet 36. In this embodiment, if the restraining torque when there is no fault is $T_R$, the restraining torque with any one phase grounded will be equal to $\frac{2}{3} T_R$.

The embodiments of the invention set forth in FIGS. 1, 3, 4 and 5 all produce the ratio ground characteristic shown in FIG. 2. A ratio of the operating torque, which varies as a function of the zero sequence $3I_0$, to the restraining torque, which lies in the tripping zone causes closure of contacts 28 and 30, while a ratio which lies in the restraint zone causes contacts 28 and 30 to remain open. The restraint quantity, as hereinbefore set forth, may vary as a function of the sum of two of the phase currents, as described relative to the FIG. 1 embodiment $(K_2|I_B|+|I_C|^2)$; it may vary as a function of the positive sequence current $I_1$ minus the negative sequence current $I_2$, as set forth in the FIG. 3 embodiment $(K_3|I_1^2-|I_2|^2)$; it may vary as a function of the sum of the three line currents, as set forth in the FIG. 4 embodiment $(K_4|I_A|^2+|I_B|^2+|I_C|^2)$; or, it may vary as a function of the positive sequence current $I_1$, as set forth in FIG. 5 embodiment $(K_5|I_1|^2)$. All of the embodiments utilize the electromechanical induction principle, and thus are easily set to coordinate with the other protective devices of the distribution circuit. While purposely being set to have a relatively long time delay before initiating a protective function, the ratio ground relay of the invention is nevertheless very sensitive, being able to detect open phases and high impedance single-phase-to-ground faults, where overcurrent and normal ground relays would be ineffective.

I claim as my invention:

1. An electromechanical ratio ground relay for detecting open phases and phase-to-ground faults in a three-phase electrical power system, with the ratio characteristic being achieved by electromechanical balancing of separate, opposing torques, comprising:
   an electroresponsive induction device having an electroconductive armature mounted for movement;
   means providing first, second and third phase current signals responsive to the three phase currents in the three-phase electrical power system, and a zero sequence signal responsive to the zero sequence current;
   first electromagnetic means responsive to the zero sequence signal for providing a magnetic flux which acts upon said armature to produce an operating torque which varies as a function of the zero sequence current;
   second electromagnetic means responsive to at least certain of the phase current signals for providing a magnetic flux which acts upon said armature to produce a restraining torque which opposes the operating torque;
   and electrical contact means actuatable by said armature to provide a predetermined signal when the ratio of said operating and restraining torques is unbalanced in favor of the operating torque.

2. An electromechanical ratio ground relay for detecting open phases and phase-to-ground faults in a three-phase electrical power system, with the ratio characteristic being achieved by electromechanical balancing of separate, opposing torques, comprising:
   an electroresponsive induction device having an electroconductive armature mounted for movement;
   means providing first, second and third phase current signals responsive to the three phase currents in the three-phase electrical power system, and a zero sequence signal responsive to the zero sequence current;
   first electromagnetic means responsive to the zero sequence signal for providing a magnetic flux which acts upon said armature to produce an operating torque which varies as a function of the zero sequence current;
   second electromagnetic means responsive to at lest certain of the phase current signals for providing a magnetic flux which acts upon said armature to produce a restraining torque which opposes the operating torque;
   said second electromagnetic means being responsive to a preselected two of the first, second and third phase current signals to provide a restraining torque which varies as a function of the sum of said preselected two phase current signals;
   and electrical contact means actuatable by said armature to provide a predetermined signal when the ratio of said operating and restraining torques is unbalanced in favor of the operating torque.

3. An electromechanical ratio ground relay for detecting open phases and phase-to-ground faults in a three-phase electrical power system, with the ratio characteristic being achieved by electromechanical balancing of separate, opposing torques, comprising:
   an electroresponsive induction device having an electroconductive armature mounted for movement;
   means providing first, second and third phase current signals responsive to the three phase currents in the three-phase electrical power system, and a zero sequence signal responsive to the zero sequence current;

first electromagnetic means responsive to the zero sequence signal for providing a magnetic flux which acts upon said armature to produce an operating torque which varies as a function of the zero sequence current;

second electromagnetic means responsive to at least certain of the phase current signals for providing a magnetic flux which acts upon said armature to produce a restraining torque which opposes the operating torque;

said second electromagnetic means being responsive to said first, second, and third phase current signals to provide a restraining torque which varies as a function of the positive sequence current minus the negative sequence current;

and electrical contact means actuatable by said armature to provide a predetermined signal when the ratio of said operating and restraining torques is unbalanced in favor of the operating torque.

4. A relay for detecting open phases and phase-to-ground faults in a three-phase electrical power system, comprising:

an electroresponsive induction device having an electroconductive armature mounted for movement;

means providing first, second and third phase current signals responsive to the three phase currents in the three-phase electrical power system, and a zero sequence signal responsive to the zero sequence current;

first electromagnetic means responsive to the zero sequence signal for providing a magnetic flux which acts upon said armature to produce an operating torque which varies as a function of the zero sequence current;

second electromagnetic means responsive to said first, second and third phase current signals for providing a magnetic flux which acts upon said armature to produce a restraining torque which varies as a function of the positive sequence current minus the negative sequence current, said second electromagnetic means including an electromagnet having a magnetic structure which includes a three legged E-unit, with the free ends of the legs defining pole faces which are disposed adjacent to the armature, and an electrical winding on each of said legs, with the three-phase current signals each being connected to a different electrical winding, and electrical contact means actuatable by said armature to provide a predetermined signal when said operating and restraining torques have a predetermined relationship.

5. An electromechanical ratio ground relay for detecting open phases and phase-to-ground faults in a three-phase electrical power system, with the ratio characteristic being achieved by electromechanical balancing of separate, opposing torques, comprising:

an electroresponsive induction device having an electroconductive armature mounted for movement;

means providing first, second and third phase current signals responsive to the three phase currents in the three-phase electrical power system, and a zero sequence signal responsive to the zero sequence current;

first electromagnetic means responsive to the zero sequence signal for providing a magnetic flux which acts upon said armature to produce an operating torque which varies as a function of the zero sequence current;

second electromagnetic means responsive to at least certain of the phase current signals for providing a magnetic flux which acts upon said armature to produce a restraining torque which opposes the operating torque;

said second electromagnetic means including first, second and third electromagnets each having a magnetic core structure which includes a winding leg having a pole face disposed adjacent to the armature, and an electrical winding on each of said winding legs, with the first, second and third phase current signals each being connected to a different winding, to provide a restraining torque which varies as a function of the sum of the first, second and third phase current signals;

and electrical contact means actuatable by said armature to provide a predetermined signal when the ratio of said operating and restraining torques is unbalanced in favor of the operating torque.

6. An electromechanical ratio ground relay for detecting open phases and phase-to-ground faults in a three-phase electrical power system, with the ratio charcteristic being achieved by electromechanical balancing of separate, opposing torques, comprising:

an electroresponsive induction device having an electroconductive armature mounted for movement;

said electroresponsive induction device including first and second electroconductive armatures coupled to collectively actuate the electrical contact means;

means providing first, second and third phase current signals responsive to the three phase currents in the three-phase electrical power system, and a zero sequence signal responsive to the zero sequence current;

first electromagnetic means responsive to the zero sequence signal for providing a magnetic flux which acts upon said armature to produce an operating torque which varies as a function of the zero sequence current;

said first electromagnetic means including an electromagnet coupled to said first armature;

second electromagnetic means responsive to at least certain of the phase current signals for providing a magnetic flux which acts upon said armature to produce a restraining torque which opposes the operating torque;

said second electromagnetic means including a first electromagnet coupled to said first armature, and second and third electromagnets coupled to said second armature, with said first, second and third electromagnets being responsive to the first, second and third phase current signals, respectively, to collectively provide a restraining torque which varies as a function of the first, second and third phase currents;

and electrical contact means actuatable by said armature to provide a predetermined signal when the ratio of said operating and restraining torques is unbalanced in favor of the operating torque.

7. An electromechanical ratio ground relay for detecting open phases and phase-to-ground faults in a three-phase electrical power system, with the ratio characteristic being achieved by electromechanical balancing of separate, opposing torques, comprising:

an electroresponsive induction device having an electroconductive armature mounted for movement;

means providing first, second and third phase current signals responsive to the three phase currents in the three-phase electrical power system, and a zero sequence signal responsive to the zero sequence current;

first electromagnetic means responsive to the zero sequence signal for providing a magnetic flux which acts upon said armature to produce an operating torque which varies as a function of the zero sequence current;

second electromagnetic means responsive to at least certain of the phase current signals for providing a magnetic flux which acts upon said armature to produce a restraining torque which opposes the operating torque;

said second electromagnetic means including means responsive to the first, second and third phase currents for providing a signal responsive to the positive sequence current, and an electromagnet having a winding responsive to said positive sequence current signal for providing a restraining torque which varies as a function of the positive sequence current;

and electrical contact means actuatable by said armature to provide a predetermined signal when the ratio of said operating and restraining torques is unbalanced in favor of the operating torque.

* * * * *